US007849100B2

(12) United States Patent
Brown et al.

(10) Patent No.: US 7,849,100 B2
(45) Date of Patent: Dec. 7, 2010

(54) METHOD AND COMPUTER-READABLE MEDIUM FOR GENERATING USAGE RIGHTS FOR AN ITEM BASED UPON ACCESS RIGHTS

(75) Inventors: Kevin Lane Brown, Woodinville, WA (US); Jason M. Cahill, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 11/069,779

(22) Filed: Mar. 1, 2005

(65) Prior Publication Data

US 2006/0200468 A1 Sep. 7, 2006

(51) Int. Cl.
*G06F 17/30* (2006.01)
(52) U.S. Cl. .................. 707/783; 707/913; 707/923; 705/51; 709/219
(58) Field of Classification Search .................. None
See application file for complete search history.

(56) References Cited

U.S. PATENT DOCUMENTS

| | | | | |
|---|---|---|---|---|
| 5,758,069 | A * | 5/1998 | Olsen ......................... | 726/27 |
| 5,790,664 | A * | 8/1998 | Coley et al. ................ | 709/203 |
| 5,905,860 | A * | 5/1999 | Olsen et al. ................ | 726/27 |
| 6,189,146 | B1 * | 2/2001 | Misra et al. ................ | 717/177 |
| 6,704,733 | B2 * | 3/2004 | Clark et al. ................ | 707/10 |
| 7,096,203 | B2 * | 8/2006 | Pence et al. ................ | 705/59 |
| 7,562,395 | B2 * | 7/2009 | DeMello et al. ............ | 726/27 |
| 2002/0013772 | A1 | 1/2002 | Peinado | |
| 2002/0049679 | A1 * | 4/2002 | Russell et al. .............. | 705/52 |
| 2002/0169854 | A1 * | 11/2002 | Tarnoff ...................... | 709/219 |
| 2002/0178271 | A1 * | 11/2002 | Graham et al. ............. | 709/229 |
| 2003/0083994 | A1 * | 5/2003 | Ramachandran et al. ... | 705/52 |
| 2004/0003268 | A1 * | 1/2004 | Bourne et al. .............. | 713/193 |
| 2004/0003269 | A1 * | 1/2004 | Waxman et al. ............ | 713/193 |
| 2004/0158527 | A1 * | 8/2004 | Lambert ..................... | 705/51 |

(Continued)

FOREIGN PATENT DOCUMENTS

EP 1 509 024 A2 2/2005

(Continued)

OTHER PUBLICATIONS

Chinese Office Action dated Oct. 10, 2008 cited in Chinese Application No. 200610004629.9.

(Continued)

*Primary Examiner*—Pierre M Vital
*Assistant Examiner*—Christopher P Nofal
(74) *Attorney, Agent, or Firm*—Merchant & Gould

(57) ABSTRACT

A method and computer-readable medium are provided for generating usage rights for an item based upon rights to access the item. According to the method, a request is received at a document management system for an item stored in a library. In response to the request, access rights to the item for the requester are determined and usage rights are generated based upon the access rights. An encrypted file is then created that contains the item and the usage rights for the item. The location of the item in the library may also be included in the protected file. When an attempt is made to store the item back in the library, a comparison is made between the location where the item was previously retrieved from (as specified within the item) and the requested location in the library for saving the item. The item is only saved in the library if the two locations match.

13 Claims, 6 Drawing Sheets

U.S. PATENT DOCUMENTS

| | | | |
|---|---|---|---|
| 2005/0005166 A1 | 1/2005 | Kouznetsov et al. | |
| 2005/0011942 A1 | 1/2005 | Adachi | |
| 2005/0049976 A1* | 3/2005 | Yang | 705/67 |
| 2005/0108176 A1* | 5/2005 | Jarol et al. | 705/59 |
| 2005/0229258 A1* | 10/2005 | Pigin | 726/27 |
| 2005/0273629 A1* | 12/2005 | Abrams et al. | 713/189 |
| 2007/0174336 A1* | 7/2007 | Day et al. | 707/104.1 |
| 2007/0192276 A1* | 8/2007 | Lee et al. | 707/1 |
| 2008/0046466 A1* | 2/2008 | Yun | 707/104.1 |
| 2008/0215632 A1* | 9/2008 | Dunkeld et al. | 707/104.1 |
| 2008/0228578 A1* | 9/2008 | Mashinsky | 705/14 |

OTHER PUBLICATIONS

Chinese Second Office Action dated Apr. 3, 2009 cited in Chinese Application No. 200610004629.9.

Chinese Third Office Action dated Jul. 17, 2009 cited in Chinese Application No. 200610004629.9.

European Search Report dated Jul. 28, 2010 cited in Application No. 06 10 1147.4 - 2212.

* cited by examiner

METHOD AND COMPUTER-READABLE MEDIUM FOR GENERATING USAGE RIGHTS FOR AN ITEM BASED UPON ACCESS RIGHTS

BACKGROUND OF THE INVENTION

File and document management systems assign access rights to libraries and items within the libraries. The access rights determine whether a user or group of users may access the items contained within the library. For instance, a user may be defined as a "viewer" of a library or an item within the library. With viewer rights, the user can download items from the library but cannot save modified versions of the items to the library. "Contributor" rights may be assigned to a user which permits the user to read and write items in the library. Additionally, "owner" rights may be assigned that allow a user to read and write items in the library and that also allow the user to assign access rights to other users. Other types of access rights may also be assigned to users.

Access rights do a good job of prohibiting unauthorized users from accessing items in a library. However, once a copy of an item is retrieved from the library, the access rights do nothing to stop subsequent distribution and use of the item. For instance, a user with viewer rights may download an item from a library in a document management system. The user may then transmit a copy of the item to a third party. The third party may then view, modify, and retransmit the item as desired even though the third party would not have otherwise been authorized to access the item stored at the document management system.

Unlike access rights, digital rights management ("DRM") rights (also referred to herein as "usage rights") can be utilized to secure items after they leave a document management system. Utilizing DRM, items in a library can be provided in an encrypted form. In order to use an item, a user must obtain a license to decrypt the item. Moreover, the license specifies the extent to which the user may utilize the item and may prohibit certain kinds of activities, such as printing, copying, or editing. If a DRM-protected item is transmitted to another user, that user must obtain their own license to use the item. If a license cannot be obtained by the user, the item may not be utilized in any manner.

While DRM rights provide sufficient protection for items after they have been removed from a document management system, use of DRM rights in conjunction with a document management system can introduce a number of drawbacks. In particular, when usage rights are utilized with a document management system that also utilizes access rights, two sets of rights must be maintained for each user or group of users. This can be time consuming and troublesome for the network administrator responsible for maintaining both sets of rights. Moreover, maintaining DRM rights for each user on every file results in large amount of data being stored for each item in library. This can quickly grow the size of a library to an unmanageable size. Additionally, maintaining items in encrypted form prevents system programs such as backup and search from directly accessing the items in their native format. In order to backup or search the items directly, the items must be decrypted. This process dramatically increases the processing overhead necessary to perform these types of operations.

It is with respect to these considerations and others that the various embodiments of the present invention have been made.

BRIEF SUMMARY OF THE INVENTION

In accordance with the present invention, the above and other problems are solved by a method and apparatus for generating usage rights for an item stored in a library from access rights to the item. By generating usage rights based upon access rights, it is only necessary to store one set of rights for each item. Moreover, because DRM rights are not stored for each user on every file, the size of the library is not increased. Additionally, items in the library are stored in the library unencrypted and are encrypted only when a request is received for an item. Because the items are stored unencrypted, system programs such as backup and search can perform their operations in a normal fashion without first decrypting the items in the library.

According to one embodiment of the invention, a method is provided for generating usage rights to an item stored in a library from access rights to the item. According to the method, a request is received at a document management system for an item stored in a library. The items may comprise electronic documents, electronic mail messages, or any other type of electronic file, and are stored in the library in an unencrypted format.

In response to the request for the item stored in the library, access rights to the item for the requestor are determined. Once the access rights have been determined, usage rights are generated based upon the access rights. An encrypted file is then created that contains the item and the usage rights for the item. The usage rights are represented in the form of a license. The protected file is then returned in response to the original request for the item.

When the item is received at the requesting computer, referred to herein as the "client computer," the client computer retrieves the license from the protected file. The license is then transmitted to a rights management server with a request for authorization to access the file. If authorization is received from the rights management server, the client computer decrypts the item and opens the item for editing. The requester may then utilize the item in the manner specified by the license. When the client computer has completed its use of the item, it may save the item back to the document management system. In order to accomplish this, the client computer encrypts the item and transmits the protected file back to the document management system.

According to an embodiment of the invention, the location of the item in the library may also be included in the protected file when transmitted to the client computer. When an attempt is made to store the item back in the library, a comparison is made between the location where the item was previously retrieved from, as specified within the item, and the requested location in the library for saving the item. The item is only saved in the library if the two locations match. Otherwise, the item will not be saved in the library. In order to facilitate this process, owner rights for the document management system may be included in the originally transmitted protected file. These rights allow the document management system to decrypt the protected item when it is returned from the client computer.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
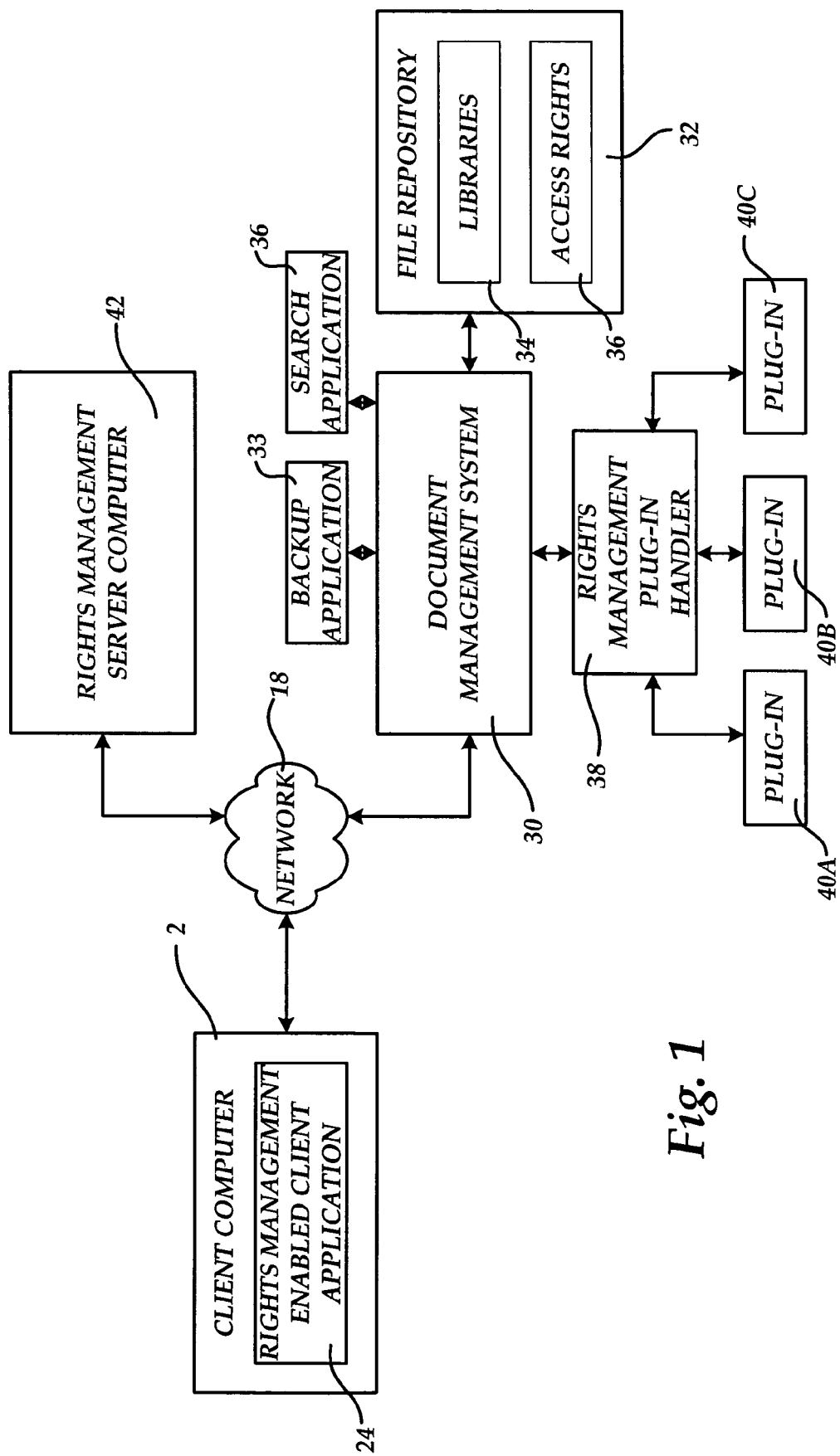
FIG. 1 is a network architecture diagram illustrating aspects of several computer systems utilized in and provided by the various embodiments of the invention.

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a network architecture diagram illustrating aspects of several computer systems utilized in and provided by the various embodiments of the invention will be described. In particular, a document management system 30 is provided according to one embodiment of the invention that is operative to generate usage rights for an item based on access rights to that item. The document management system 30 includes a file repository 32 in which it stores items organized into libraries 34. The items may comprise electronic documents, electronic mail messages, images, or any other type of electronic file.

The document management system 30 is also operative to maintain access rights 36 for the libraries 34 and individual items within the libraries 34. The access rights 36 determine whether a user or group of users may access the particular library or specific items contained within the library. For instance, a user may be defined as a "viewer" of a library or an item within the library. With viewer rights, the user can download items from the library but cannot save modified versions of the items to the library. "Contributor" rights may be assigned to a user which permits the user to read and write items in the library. Additionally, "owner" rights may be assigned that allow a user to read and write items in the library and that also allow the user to assign access rights to other users. Other types of access rights may also be assigned to users. As will be described in greater detail below, the document management system 30 is operative to generate usage rights to an item based upon a user's access rights to the item.

In conjunction with the provision of document management services, the document management system 30 may utilize the services of one or more external programs. In particular, the document management system 30 may utilize the services of a backup application for backing up the contents of the repository 32 to a backup device. The document management system 30 may also utilize a search application 36 for searching the contents of the file repository 32. According to the various embodiments of the invention, the contents of the file repository 32 are stored in an unencrypted format so that the backup and search applications, and other authorized application programs, can perform their functions on the contents of the file repository 32 without decrypting the items. However, to all other users of the document management system 30, such as a user of the client computer 2, the contents of the file repository 32 appear to be protected. Details regarding the protection applied to the items contained within the libraries 34 are provided below.

The document management system 30 also utilizes the services of a rights management plug-in handler 38. The plug-in handler 38 offloads from the document management system 30 the task of applying DRM to specific types of items. To accomplish this, the plug-in handler 38 includes an extensible framework into which plug-ins 40A-40C (also referred to herein as "protectors") may be connected. Each of the plug-ins 40A-40C are responsible for applying DRM to a specific type of item within the repository 32. For instance, the plug-in 40A may be operative to apply DRM to an item associated with a word processing application program, the plug-in 40B may be operative to apply DRM to an item associated with an image editing application, and the plug-in 40C may be operative to apply DRM to another type of item. Other plug-ins for other types of items may also be utilized in conjunction with the plug-in handler 38.

In order to apply DRM to a particular item, the plug-ins 40A-40C may communicate with a rights management server computer 42. The rights management server computer 42 is operative to handle the certification of trusted entities, licensing of rights-protected items, enrollment of services and users, and administration functions. Additional details regarding the operation of the rights management server computer 42 will be provided below.

Embodiments of the invention also utilize a client computer 2 connected to the document management system 30 and the rights management server computer 42 via the network 18. The client computer 2 comprises a standard laptop, desktop, or handheld computer capable of executing a rights management-enabled client application 24. The client application 24 is operative to request items from the file repository 32. As will be described in greater detail below, an item provided in response to such a request is protected utilizing DRM. Accordingly, the client application 24 must recognize the item as being DRM protected and communicate with the rights management server computer 42 as necessary to decrypt the item for use. If the client application 24 desires to save the item back to the repository 32, the client application 24 must also be operative to communicate with the rights management server computer 42 to encrypt the item prior to transmission to the document management system 30. Additional details regarding this process will be provided below with respect to FIGS. 3-6.

Figure 2:
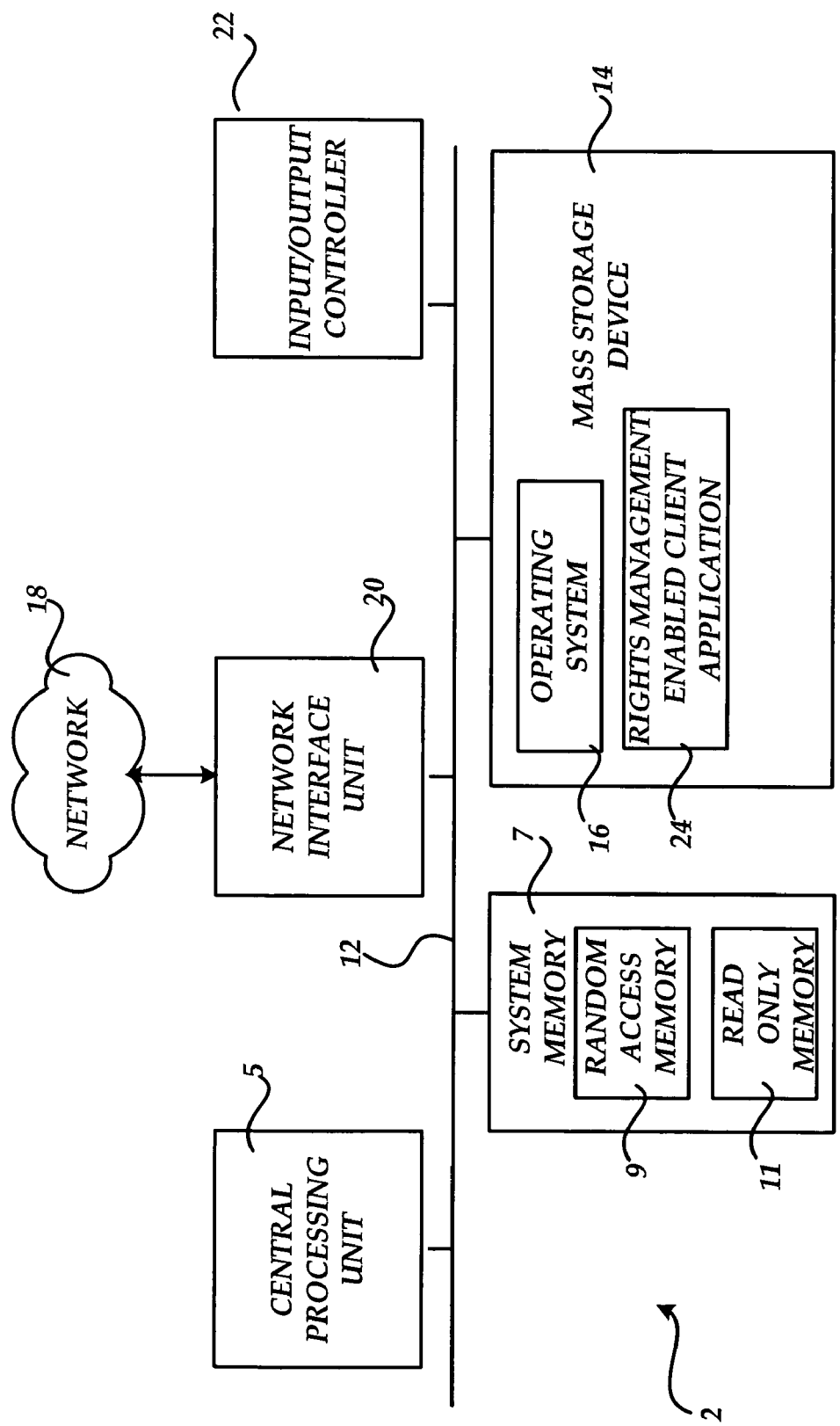
FIG. 2 is a computer system architecture diagram illustrating aspects of a client computer system utilized in one embodiment of the invention.

Turning now to FIG. 2, an illustrative computer architecture for a computer 2 utilized in the various embodiments of the invention will be described. The computer architecture shown in FIG. 2 illustrates a conventional desktop, laptop, or handheld computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a rights management-enabled client application 24. As described briefly above, the client application 24 is operative to request items from the file repository 32. The client application 24 is also operative to communicate with the rights management server computer 42 to encrypt and decrypt items protected by DRM. According to one embodiment of the invention, the client application 24 comprises the MICROSOFT OFFICE suite of productivity applications. It should be appreciated, however, that other types of client applications programs may be utilized with the various embodiments of the invention provided herein.

It should also be appreciated that the document management system 30 and the rights management server computer 42 may utilize some or all of the conventional computing components illustrated in FIG. 2. In particular, the document management system 30 may also store a number of program modules and data files needed to provide document management services. In particular, the document management system 30 may store and execute an operating system suitable for the operation of a networked server computer, program modules for providing document management services, and program modules for generating usage rights for an item based upon access rights to the item. In this regard, the document management system 30 may store items arranged in libraries 34 in a repository 32. For each library 34 and item, the document management system 30 may also maintain access rights 36 to the library or item. The document management system 30 may also store a plug-in handler 38, a backup application 33, and a search application 36.

Figure 3:
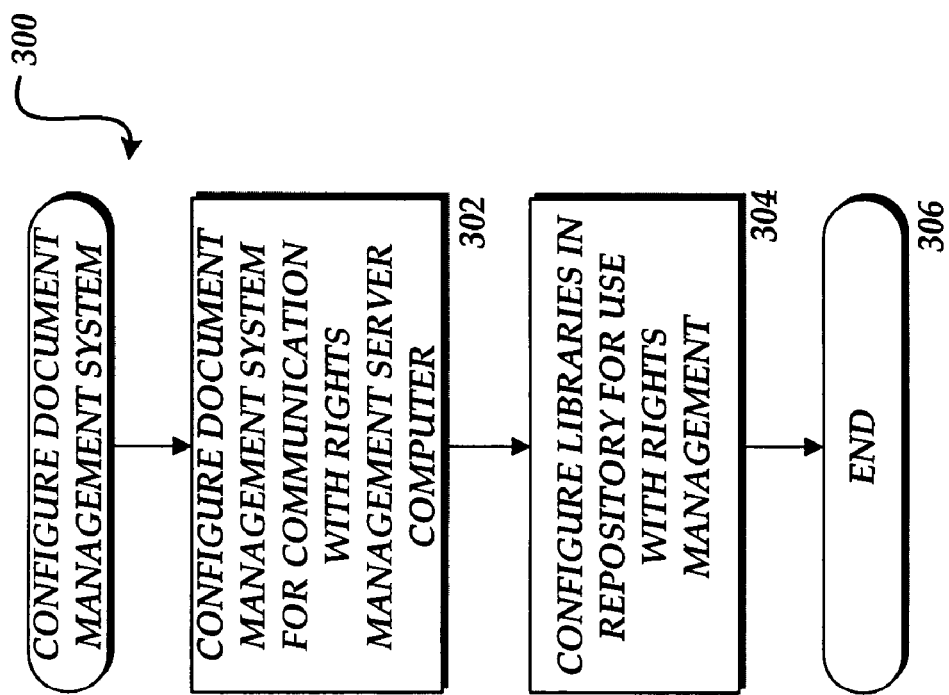
FIGS. 3-6 are flow diagrams illustrating aspects of a method provided by the various embodiments of the invention for generating usage rights for an item based upon access rights to the item.

Referring now to FIG. 3, an illustrative routine 300 will be described illustrating a process for configuring a document management system to create usage rights based upon access rights. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3-6, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where the document management system 30 is configured for use with the rights management server computer 42. This may include, for instance, providing a network address for the rights management server computer 42 to the document management server 30. This may also include registering the plug-ins 40A-40C with the rights management plug-in handler 38 of the document management system 30.

From operation 302, the routine 300 continues to operation 304, where the libraries 34 are configured for use with rights management. In particular, the libraries 34 and the items within them are identified as being protected or unprotected. Requests for items within libraries identified as protected will be processed in the manner described herein. In this way, items will be returned in response to such requests that are DRM protected and that include usage rights for the requestor that have been generated based upon the requestor's access rights to the item. Additional details regarding this process are provided below. From operation 304, the routine 300 continues to operation 306, where it ends.

Figure 4:
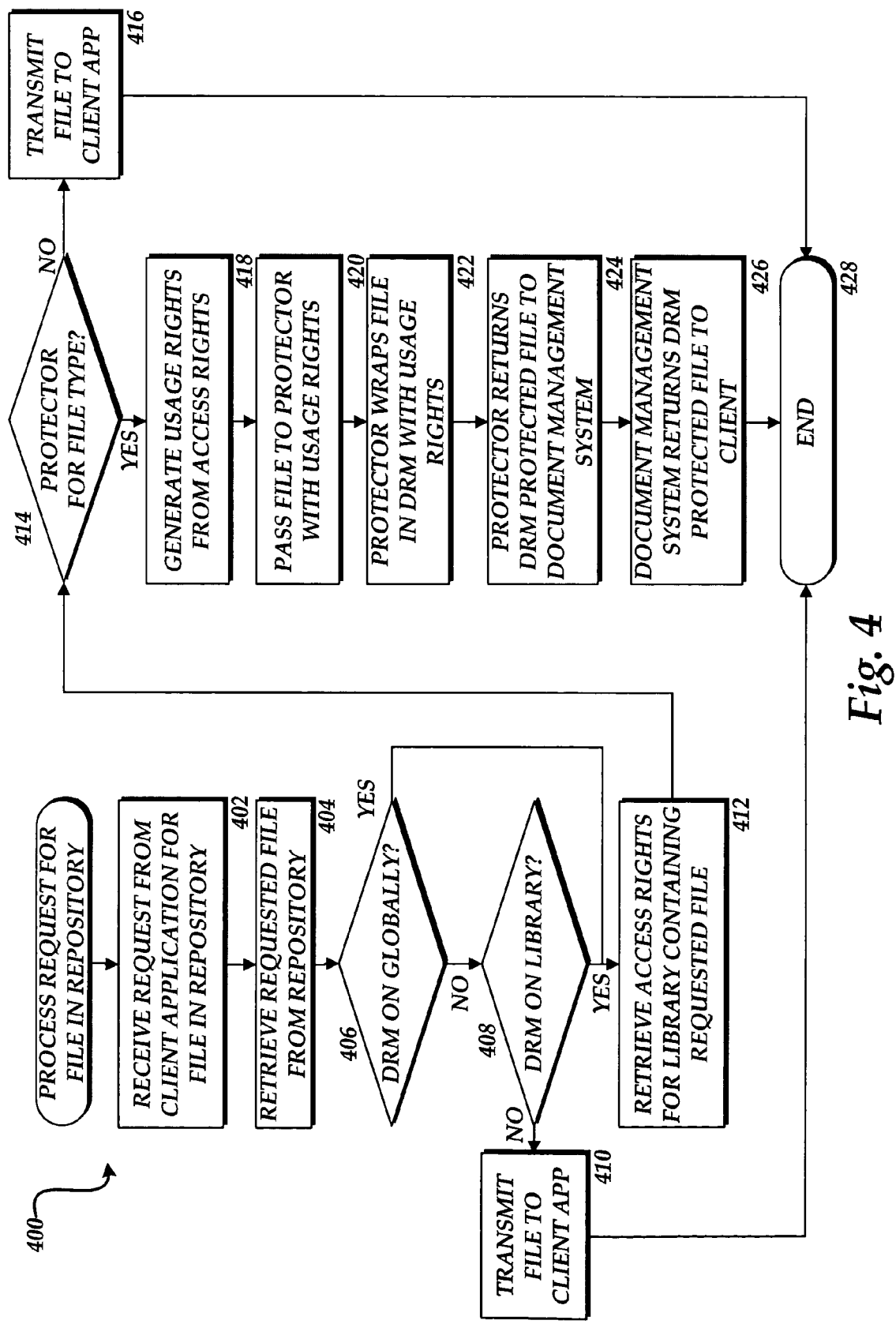

Turning now to FIG. 4, an illustrative routine 400 will be described for processing a request for an item within a library 34 at the document management system 30. The routine 400 begins at operation 402, where the document management system 30 receives a request from the client application 24 for an item in the repository 32. In response to the request, the document management system 30 retrieves the requested item from the repository 32 at operation 404. The routine 400 then continues to operation 406, where the document management system 30 determines whether digital rights management has been enabled globally for all items in the repository 32. If rights management has been enabled globally, the routine 400 branches to operation 412, described below.

If, at operation 406, the document management system 30 determines that DRM is not enabled globally, the routine 400 continues from operation 406 to operation 408. At operation 408, the document management system 30 determines whether DRM has been enabled for the particular library 34 that contains the requested item. If DRM has not been enabled for the library 34, the routine branches to operation 410, where the requested item is transmitted to the client application 24 without the application of DRM. The routine 400 then continues from operation 410 to operation 428, where it ends. If DRM has been enabled for the library 34 containing the requested item, the routine 400 continues from operation 408 to operation 412.

At operation 412, the document management system 30 retrieves the access rights 36 for the library 34 containing the requested item. The routine 400 then continues to operation 414, where the document management system 30 determines whether a plug-in 40A-40C exists for the type of the requested item. If an appropriate plug-in 40A-40C does not exist, the routine 400 branches to operation 416, where the requested item is transmitted to the client application 24 without the application of DRM. From operation 416, the routine 400 continues to operation 428, where it ends.

If, at operation 414, the document management system 30 determines that an appropriate plug-in 40A-40C exists for the requested item, the routine 400 continues to operation 418. At operation 418, the document management system 30 generates usage rights for the requested item from the access rights 36 for the item. The usage rights potentially include rights to view, edit, save, copy, print, access content programmatically, content expiration, and the right to give other users permissions. The usage rights are based upon the requesting users' access rights to the item. So, for instance, if the user is defined as a "viewer" of the library containing the requested item, the usage rights may include only viewing usage rights. If the requestor is defined as a "contributor" of the library, the usage rights may include usage rights to view, edit, save, copy, and print the item. If the requestor is defined as an "owner," all of the possible usage rights may be granted. In this manner, access rights are mapped to usage rights for the item.

Once the usage rights have been generated, the routine 400 continues to operation 420, where the document management system 30 passes the requested item to the appropriate plug-in with the generated usage rights. The routine 400 then continues to operation 422, where the plug-in communicates with the rights management server 42 and encrypts the item with DRM, including a license that specifies the usage rights for the item. The plug-in then returns the DRM encrypted file to the document management system 30 at operation 424. At operation 426, the document management system 30 transmits the DRM protected file, including the license containing the usage rights generated from the access rights, to the client application 24 in response to the original request for the item. The routine 400 then continues to operation 428, where it ends.

According to one embodiment of the invention, the document management server 30 is also operative to store the location of the item within the libraries 34 in the file returned to the client application 24. As will be described in greater detail below, when a request is received to save a file to the libraries 34, the document management system 30 may utilize the stored location to determine if the item is being stored in the identical library from which it came. If an attempt is made to save the item to a different library, the request will be denied. This prevents a user from saving an item to a library for which they have greater access rights than the location from which the item was initially retrieved. Owner rights for the document management system 30 may also be added to the license so that the document management system 30 can decrypt the item upon its return from the client application 24. Additional details regarding this process will be described below with reference to FIG. 6.

Figure 5:
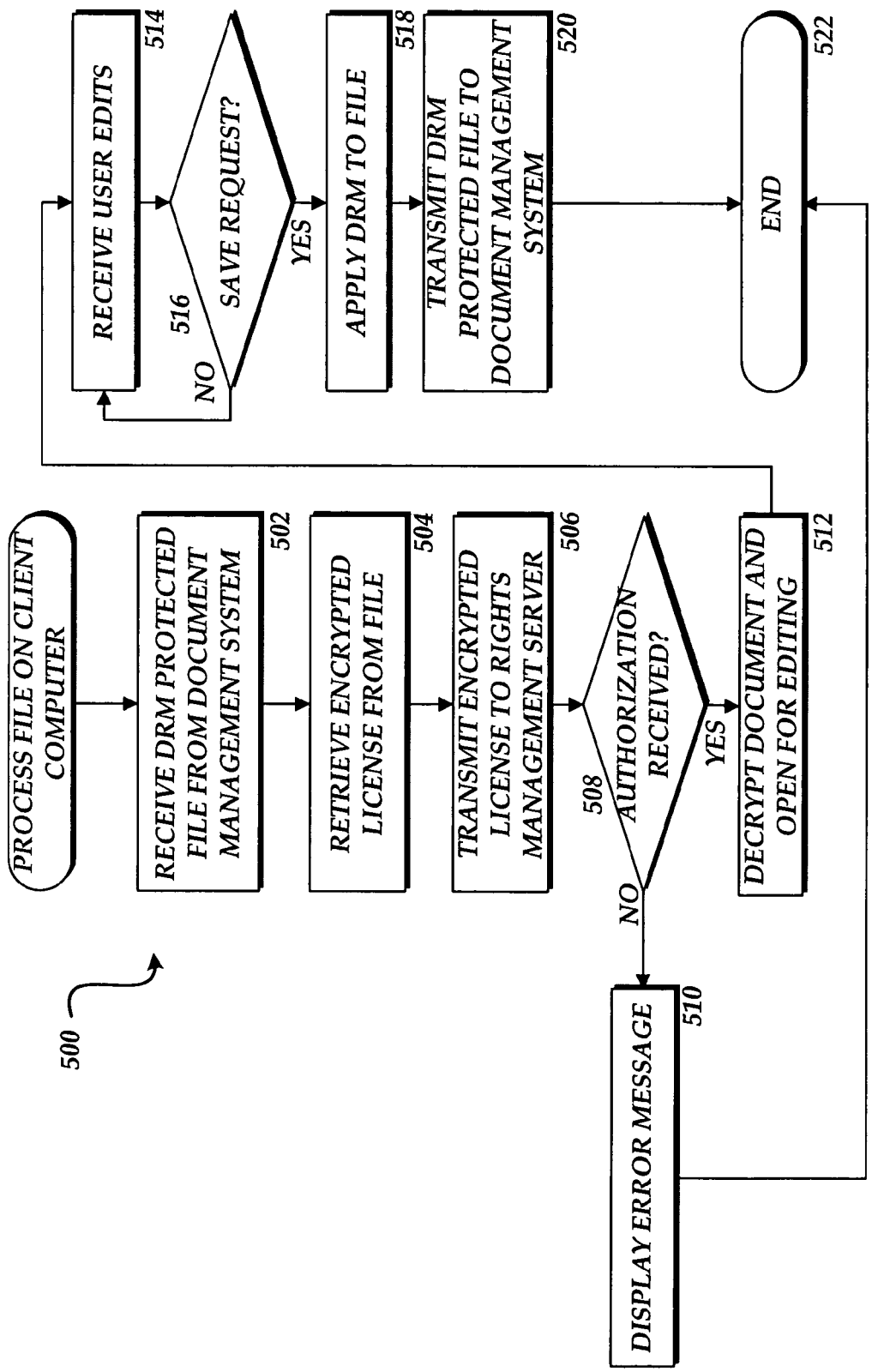

Referring now to FIG. 5, an illustrative routine 500 will be described illustrating the process performed by the client application 24 for receiving a DRM-protected item from the document management system 30 and for saving a modified version of the item back to the document management system 30. The routine 500 begins at operation 502, where the client application 24 receives the DRM protected file from the document management system 30. The routine 500 then continues to operation 504, where the client application 24 retrieves the license from the received file. The client application 24 then transmits the license to the rights management server computer 42 with a request to access the DRM protected item. At operation 508, a determination is made as to whether the rights management server computer 42 responded with the decryption key for the item. If the rights management server computer 42 does not respond with authorization to open the item, the routine 500 branches to operation 510, where an error is displayed. The routine 500 then continues to operation 522, where it ends.

If, at operation 508, the client application 24 determines that the rights management server computer 42 has authorized access to the item, the routine 500 continues to operation 512, where the client application 24 decrypts the item and opens it for viewing or editing as specified within the license. The routine 500 then continues to operation 514, where the user is free to edit and otherwise utilize the item as specified by the license. From operation 514, the routine 500 continues to operation 516, where a determination is made by the client application 24 as to whether the user has requested to save the file. If such a request has not been made, the routine 500 returns to operation 514. If a save request is received, the routine 500 continues to operation 518.

At operation 518, the client application 24 applies DRM 24 to the item. The client application 24 may communicate with the rights management server computer 42 to perform this process. The routine 500 then continues to operation 520, where the client application 24 transmits the DRM protected item back to the document management system 30. The routine 500 then continues to operation 522, where it ends.

Figure 6:
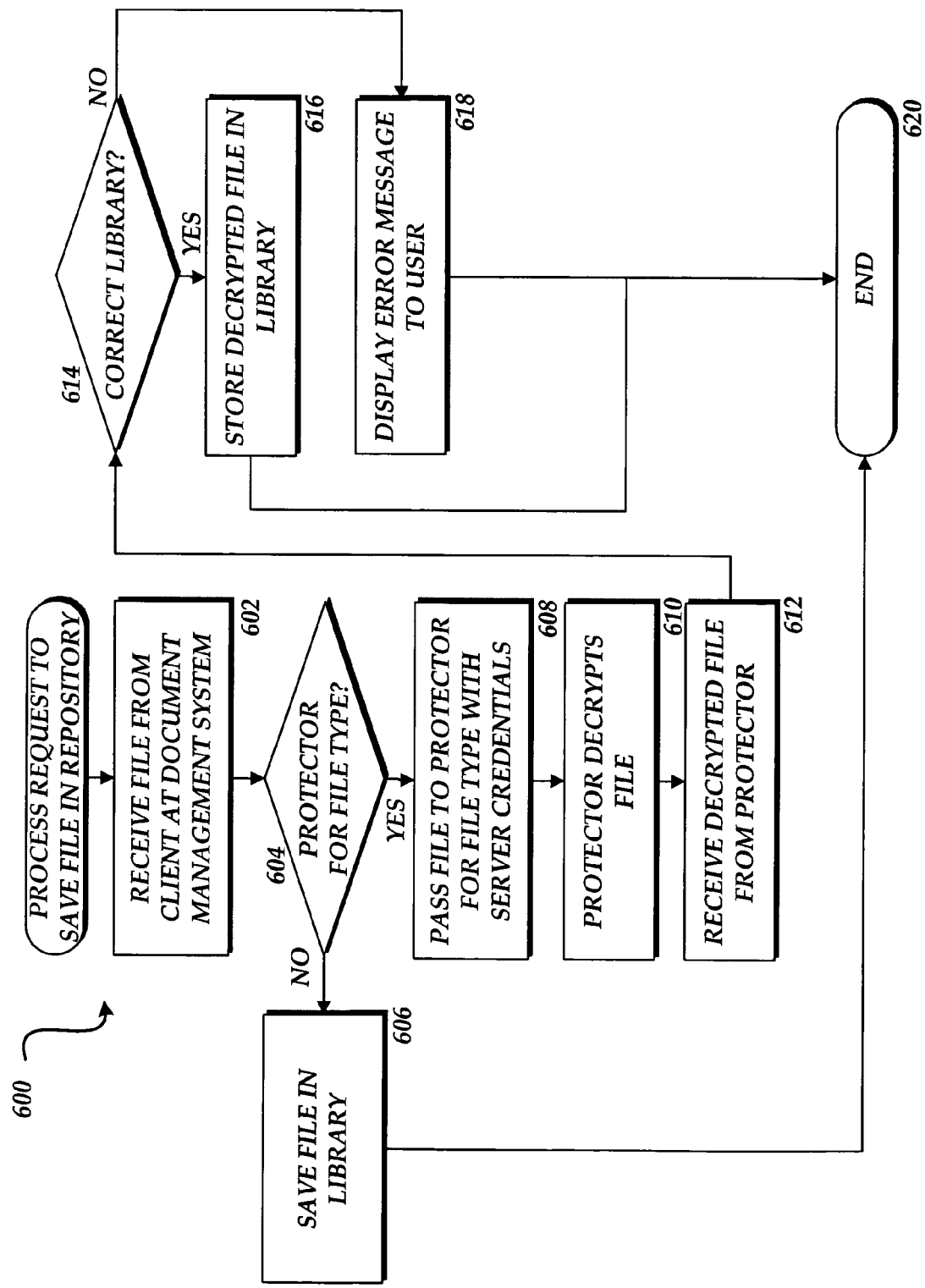

Turning now to FIG. 6, an illustrative routine 600 will be described for processing a request to save an item within a library 34 at the document management system 30. The routine 600 begins at operation 602, where the document management system 30 receives the DRM protected file from the client application 24. The routine 600 then continues to operation 604, where the document management system 30 determines whether a plug-in 40A-40C exists to remove the DRM from the received file. If no plug-in 40A-40C is present for the item type, the routine 600 branches to operation 606, where the file is stored in the library in encrypted form. From operation 606, the routine 600 continues to operation 620, where it ends.

If, at operation 604, the document management system 604 determines that an appropriate plug-in 40A-40C exists for the item type, the routine 600 continues to operation 608, where the document management system 30 passes the received file to the appropriate plug-in with its credentials for decrypting the item. At operation 610, the plug-in decrypts the item and returns the item to the document management system 30. At operation 612, the document management system 30 receives the decrypted item from the plug-in and determines whether the location the item was previously retrieved from is the same location as the requested location in the library for saving the item. If the locations are not the same, the routine 600 branches from operation 614 to operation 618, where an error message is displayed and the item is not saved to the library. If, however, the locations are the same, the routine 600 continues to operation 616, where the decrypted item is stored in the library in the appropriate location. From operations 616 and 618, the routine 600 continues to operation 620, where it ends.

Based on the foregoing, it should be appreciated that the various embodiments of the invention include a method, system, apparatus, and computer-readable medium for generating usage rights for an item from rights to access the item. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for generating usage rights for an item stored in a library, the computer-implemented method comprising:
    receiving a request to retrieve an item stored in the library, wherein the item is unencrypted;
    in response to the request, determining whether a protector exists for the item, wherein the determining comprises ascertaining whether digital rights management (DRM) has been enabled for the library and determining whether a plug-in capable of applying the DRM to the item's type of file is available;
    retrieving access rights for the item if the protector exists;
    determining an access level of an entity requesting access to the item, wherein the access level is associated with one of an owner, a contributor, and a viewer;
    in response to the request to retrieve the item, dynamically generating a mapping table based on un-stored usage rights for the item, the access rights, and the access level; wherein only viewing, editing, saving, copying, and printing usage rights are associated with the access rights when the access level is associated with the contributor; wherein only viewing usage rights are associated with the access rights when the access level is associated with the viewer; and wherein all usage rights are associated with the access rights when the access level is associated with the owner;
    passing the item to the protector, wherein the protector encrypts the item and the usage rights in a protected file, includes a location of the item in the library in the protected file, and includes owner usage rights in the protected file; wherein the owner usage rights being present in the file permits a computer system operative to access the library; and
    returning the protected file in response to the request to retrieve the item from the library.

2. The method of claim 1, wherein the item is stored in the library in an unencrypted format.

3. The method of claim 2, wherein generating usage rights further comprises generating owner rights to the item for a computer receiving the request to access the item.

4. The method of claim 1, wherein the item's file type is associated with a word processing application.

5. The method of claim 1, wherein the item's file type is associated with an image editing application.

6. The method of claim 1, further comprising: in response to determining that the item is not of the protectable type, returning an unprotected file in response to the request to access the item.

7. The method of claim 1, wherein determining if the item is of the protectable type comprises determining whether the DRM is enabled for all items in the library.

8. A computer-readable storage medium having computer-executable instructions stored thereon, which when executed by a computer will cause the computer to:
    receive a request to retrieve an item stored in the library, wherein the item is unencrypted;
    in response to the request, determine whether a protector exists for the item, wherein the determining comprises ascertaining whether digital rights management (DRM) has been enabled for the library and determining whether a plug-in capable of applying the DRM to the item's type of file is available;
    retrieve access rights for the item if the protector exists;
    determine an access level of an entity requesting access to the item, wherein the access level is associated with one of an owner, a contributor, and a viewer;
    in response to the request to retrieve the item, dynamically generate a mapping table based on un-stored usage rights for the item, the access rights, and the access level; wherein only viewing, editing, saving, copying, and printing usage rights are associated with the access rights when the access level is associated with the contributor; wherein only viewing usage rights are associated with the access rights when the access level is associated with the viewer; and wherein all usage rights are associated with the access rights when the access level is associated with the owner;
    pass the item to the protector, wherein the protector encrypts the item and the usage rights in a protected file, includes a location of the item in the library in the protected file, and includes owner usage rights in the protected file; wherein the owner usage rights being present in the file permits a computer system operative to access the library; and
    return the protected file in response to the request to retrieve the item from the library.

9. The computer-readable storage medium of claim 8, wherein the request to retrieve the item is received from the entity and wherein retrieving the access rights for the item comprises retrieving the access rights for the item for only the requestor.

10. The computer-readable storage medium of claim 9, comprising further computer-readable instructions, which when executed by the computer will cause the computer in response to determining that the plug-in capable of applying the DRM to the item's type of file is unavailable, to return an unencrypted file in response to the request to retrieve the item from the library.

11. The computer-readable storage medium of claim 8, wherein the item is stored in the library unencrypted.

12. The computer-readable storage medium of claim 8, further comprising inserting owner usage rights in the protected file for a computer system operative to access the library.

13. A system for generating usage rights for an item stored in a library, the system comprising:
   a memory;
   at least one processing device coupled to the memory, the memory having instruction encoded thereon which, when executed, cause the processing device to:
      receive a request to retrieve an item stored in the library, wherein the item is unencrypted;
      in response to the request, determine whether a protector exists for the item, wherein the determining comprises ascertaining whether digital rights management (DRM) has been enabled for the library and determining whether a plug-in capable of applying the DRM to the item's type of file is available;
      retrieve access rights for the item if the protector exists;
      determine an access level of an entity requesting access to the item, wherein the access level is associated with one of an owner, a contributor, and a viewer;
      in response to the request to retrieve the item, dynamically generate a mapping table based on un-stored usage rights for the item, the access rights, and the access level; wherein only viewing, editing, saving, copying, and printing usage rights are associated with the access rights when the access level is associated with the contributor; wherein only viewing usage rights are associated with the access rights when the access level is associated with the viewer; and wherein all usage rights are associated with the access rights when the access level is associated with the owner;
      pass the item to the protector, wherein the protector encrypts the item and the usage rights in a protected file, includes a location of the item in the library in the protected file, and includes owner usage rights in the protected file; wherein the owner usage rights being present in the file permits a computer system operative to access the library; and
      return the protected file in response to the request to retrieve the item from the library.

* * * * *